United States Patent [19]

Cecchi

[11] Patent Number: 5,428,649
[45] Date of Patent: Jun. 27, 1995

[54] ELASTIC BUFFER WITH BIDIRECTIONAL PHASE DETECTOR

[75] Inventor: Delbert R. Cecchi, Rochester, Minn.

[73] Assignee: International Business Machines Corporation, Armonk, N.Y.

[21] Appl. No.: 168,799

[22] Filed: Dec. 16, 1993

[51] Int. Cl.⁶ ............... H04L 7/00; H04L 25/36; H04L 25/40
[52] U.S. Cl. ............... 375/372; 370/102; 370/108
[58] Field of Search ............... 375/118, 119; 370/100.1, 101, 102, 105.3, 108, 105

[56] References Cited

U.S. PATENT DOCUMENTS

| | | | |
|---|---|---|---|
| 4,429,386 | 1/1984 | Graden | 370/100 |
| 4,764,942 | 8/1988 | Shigaki et al. | 375/118 |
| 4,839,893 | 6/1989 | Smith | 370/100 |
| 4,849,969 | 7/1989 | Annamalai | 370/100 |
| 4,849,970 | 7/1989 | McCool | 370/100 |
| 4,885,758 | 12/1989 | Speckenbach | 375/118 |
| 4,920,547 | 4/1990 | Murakami et al. | 370/102 X |
| 4,945,548 | 7/1990 | Iannarone et al. | 375/118 X |
| 4,965,794 | 10/1990 | Smith | 370/105.1 |
| 5,142,529 | 8/1992 | Parruck et al. | 370/84 |
| 5,146,477 | 9/1992 | Cantoni et al. | 375/112 |
| 5,311,511 | 5/1994 | Reilly et al. | 370/105.3 X |
| 5,323,426 | 6/1994 | James et al. | 375/118 |

OTHER PUBLICATIONS

"IEEE Standard for Scalable Coherent Interface (SCI)", Institute of Electrical and Electronics Engineers, Inc., IEEE Std. 1596-1992, New York, N.Y., Aug. 2, 1993, pp. 1-83.

*Primary Examiner*—Stephen Chin
*Assistant Examiner*—Amanda T. Le
*Attorney, Agent, or Firm*—J. Michael Anglin; Keith L. Hargrove; Andrew J. Dillon

[57] ABSTRACT

An elastic buffer utilizes a circular buffer for receiving successive symbols over a communications link. The transmission clock of the received symbols and internal clock of the node on which the elastic buffer is located are independent. The transmission clock is used to load the successive symbols received over the transmission link into the circular buffer. The internal clock controls reading of the successive symbols from the circular buffer. A phase comparator operating on the transmission and internal clocks periodically generates an input side skip signal when the transmission clock overtakes the phase of the internal clock and an output side skip signal when the internal clock overtakes the phase of the external clock. An idle symbol detector monitors the successive symbols generates an idle indication when an idle symbol occurs. Responsive to concurrence of an input side skip signal and an idle indication, loading of an idle symbol from successive symbols into the circular buffer is omitted. Responsive to occurrence of an output side skip signal, the reading of successive symbols from the circular buffer is delayed for an internal clock period.

19 Claims, 3 Drawing Sheets

ELASTIC BUFFER WITH BIDIRECTIONAL PHASE DETECTOR

BACKGROUND OF THE INVENTION

1. Technical Field

The invention relates to buffering received data on plesiochronous nodes of a data processing system and more particularly to application of elastic buffers in such nodes where the nodes are linked by extremely high speed unidirectional data links such as provided for the scalable coherent interface (SCI).

2. Description of the Related Art

In digital data processing systems, particularly multiple processor systems, the conventional backplane multi-drop bus has become a serious constraint on system performance because of throughput limitations, bus access contention problems and electro-magnetic interference generation. To move past the multidrop bus the Institute of Electrical and Electronics Engineers (IEEE) has established the IEEE Standard for Scalable Coherent Interface (IEEE Std 1596-1992) to provide computer bus like services using a collection of fast node to node unidirectional links for multiprocessor systems using a distributed coherent shared memory configuration.

The SCI and the similar IBM SCIL system provide local clocks, which are preferably tuned to a nominal transmission clock frequency, e.g. 500 Megahertz. No node is master of the system, and thus while the nodes preferably operate at the same clock speed, each node is clocked by a local oscillator. Oscillators are subject to unsynchronized drift with the result that each node actually operates at its own, varying frequency. Typically an allowance for difference between consecutive nodes (an external and an internal clock) must allow for a variation of 1000 ppm in frequency.

An SCI node is itself almost entirely synchronous. The only asynchronous part of the node is the first stage for receiving data. The clock for the received data is the same as the clock for the node which transmitted data.

SCI and SCIL provide for transmission of parallel data over the unidirectional links in delimited packets with the transmission clock for the data. These symbols are spaced by idle packets at a sufficient frequency to allow symbol skipping when required to realign the phase of a lower frequency receiving node to a higher frequency transmitting node. When a skip occurs, an idle symbol is discarded. Where the receiving node is faster, the opposite operation, i.e. idle symbol stuffing occurs. That is, an extra symbol is added to the packet sequence. The use of elastic buffers for skipping and stuffing operations to overcome phase drift is well known. Idle symbols are in fact sometimes called elasticity symbols.

Unfortunately, operation at high frequencies which are close to the physical limitations of a technology, such as 500 Megahertz for silicon based technology, can make idle symbol stuffing difficult if not impossible. To stuff a symbol, a node is called on to carry out two cycles in almost exactly the period allowed for one cycle. Such an operating speed may simply be unobtainable, even for short periods. It would be valuable to avoid the need to engage in symbol stuffing.

SUMMARY OF THE INVENTION

It is an object of the invention to provide for buffering received data on plesiochronous or mesochronous interfaces for nodes of a data processing system.

It is another object of the invention to provide an elastic buffers for receiving data over an extremely high speed unidirectional data link such as provided by the scalable coherent interface (SCI) or similar systems.

The above and other objects are achieved as is now described. An elastic buffer has a circular buffer with a plurality of symbol storage registers. As is conventional in the art, successive symbols are stored in each symbol storage register as clocked by the external or transmit clock received over a transmission link. Symbols are successively read from the symbol storage register as clocked by a node internal clock. Preferably, the reading of symbols trails the writing of symbols by $\pi$ radians. A phase comparator takes the external clock and the internal clock as inputs and generates a first input when the input clock has gained on the phase of the external clock and a second input when the input clock has lost on the phase of the external clock.

An idle symbol detector takes the received data as an input and generates an idle signal in response to each idle symbol in the data stream received over the transmission link. Responsive to an indication that the internal clock has gained on the phase of the external clock, a beat of the internal clock is skipped in reading the circular buffer. Responsive to indication that the internal clock has lost on the phase of the external clock and the concurrent presence of an idle signal, a beat of the external clock is skipped resulting in dropping a concurrent idle symbol from the successive sequence of symbols.

By skipping idle symbols on the input side, or periodically postponing reading of successive symbols on the output side of the elastic buffer, the phase of the external and internal clocks may be maintained in the proper relationship without the use of symbol stuffing.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
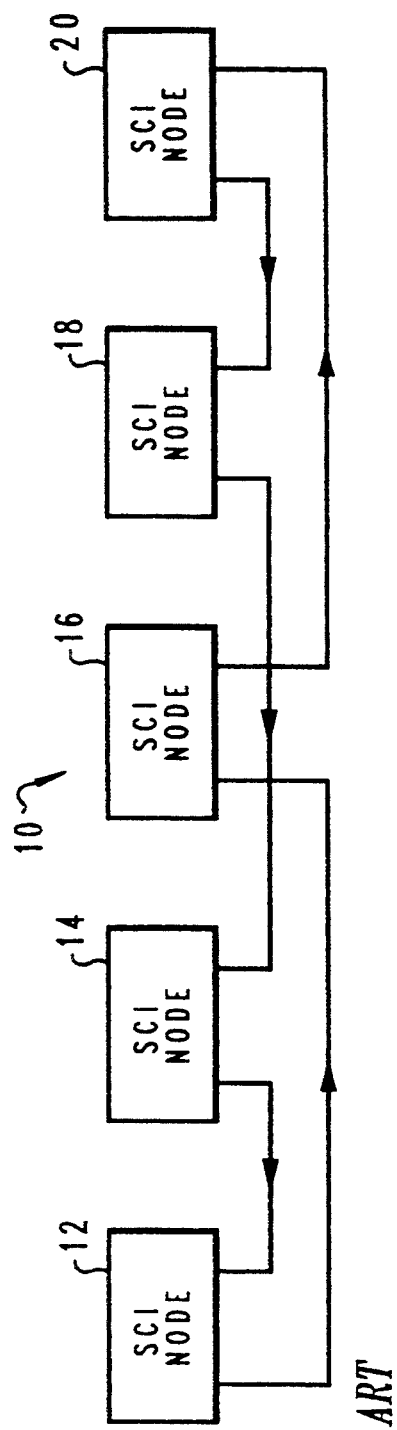
FIG. 1 is a high level block diagram of a multiple SCI node data processing system.

With reference now to the figures and in particular with reference to FIG. 1, there is depicted in a block diagram a distributed data processing system 10 comprising a plurality of nodes 12, 14, 16, 18 and 20. A given node is typically a memory node, a processing node or both. Both memory and data processing are distributed. Nodes 12, 14, 16, 18 and 20 are interconnected by a plurality of unidirectional data transmission links. In the preferred embodiment, data are sent in parallel over the unidirectional links clocked by the transmitting node. Data packets are sent at each clock cycle with idle symbols periodically interspersed among data symbols. The parallel format is 18 bits wide and includes 16 bits of data, a clock signal (1 bit) and a framing flag (1 bit). Node clocks are independent of one another.

Figure 2:
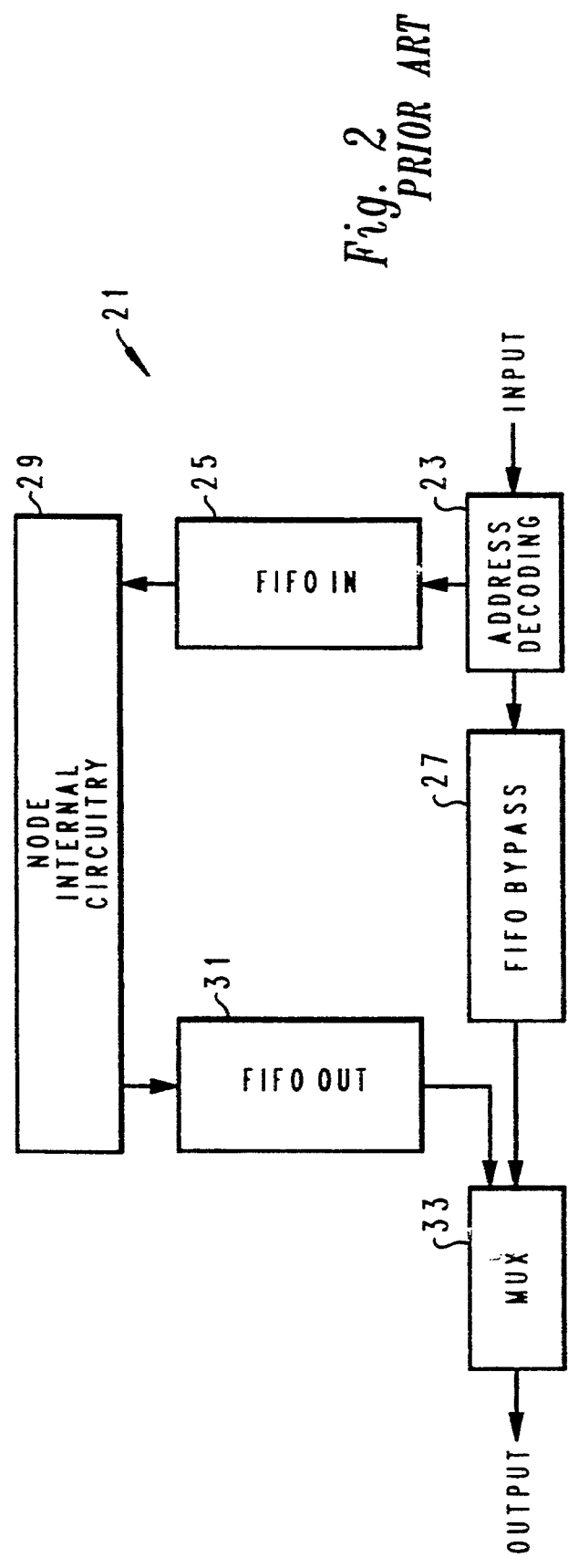
FIG. 2 is a block diagram of an SCI node.

FIG. 2 is a block diagram of an SCI node 21 suitable for inclusion in distributed data processing 10. Node 21 is connected to receive data packets on an address decoder 23 which routes data packets based on intended destination. Data packets intended for node 21 are routed to a First-In, First-Out (FIFO) input buffer 25. Data packets addressed to nodes other than the node 21 are routed to FIFO bypass buffer 27. Processing or memory circuitry are represented by node internal circuitry 29 which utilizes data packets received from FIFO input buffer 25 and which places data packets for transmission onto a FIFO output buffer 31. A multiplexor 33 controls sequencing of data for transmission between FIFO bypass buffer 27 and FIFO output buffer 31.

The clock of data transmitted from multiplexor 33 is the same, or at least has a fixed relationship to, the clock of node internal circuitry 29. The clock for data received by address decoder 23 is that for the immediately preceding node. The internal clock for node 21 and the transmission clock received by FIFO buffers 25 and 27 are independent and the clocks may drift in an unpredictable fashion relative to one another in phase and frequency although both clocks are designed to operate at the same frequency. Therefore data is docked into buffers 25 and 27 by a clock signal with an unpredictable phase and frequency relationship to the clock used on reading the data packets out of the buffers.

Unpredictable frequency and phase differentials over an interface have commonly been met by use of elastic buffers which skip idle symbols when the transmission frequency exceeds the receiving frequency and by stuffing idle symbols in the sequence of packets when the opposite is true. However, at the preferred operating speeds of the unidirectional data links utilized with node 21, data packet stuffing is not practical.

Figure 3:
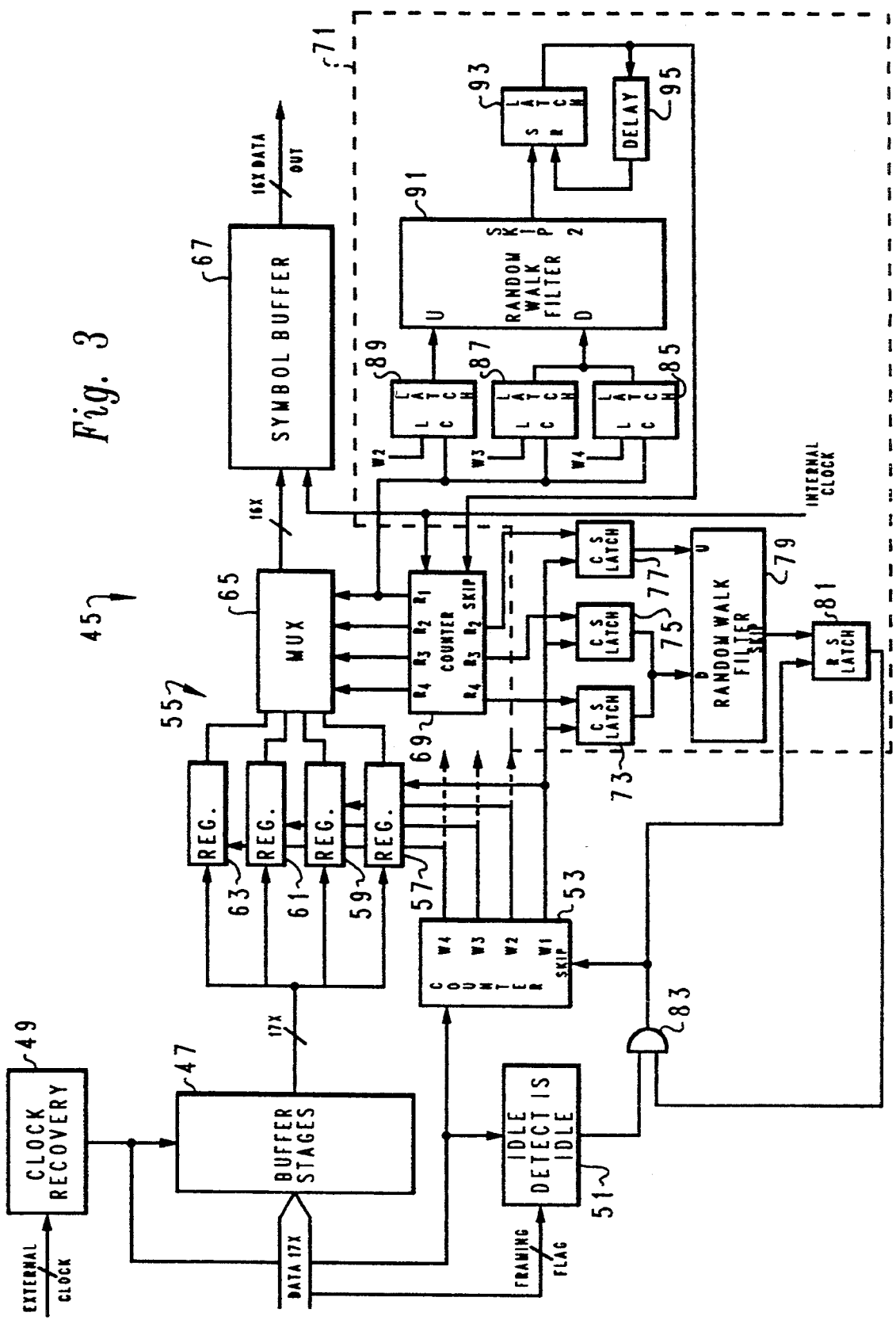
FIG. 3 is a block diagram of an elastic buffer suitable for use in an SCI or SCIL node.

FIG. 3 is an elastic buffer 45 which may be advantageously utilized to implement either FIFO bypass buffer 27 or FIFO input buffer 25. In elastic buffer 45 data and the framing flag are received by buffering stages 47. The transmission (external) clock of the sequence of received data packets is regenerated by a clock recovery circuit 49, which may be provided by a phase lock loop or other regeneration circuit. The framing flag of the data packet is also applied to an idle detect circuit 51 which utilizes the framing flag to indicate if a packet is an idle symbol (ISIDLE high) or not.

The regenerated external clock is used to clock the input side of elastic buffer 45. The regenerated clock 49 is directly applied to buffering stages 47, idle detect circuitry 51 and a counter 53. Counter 53 in effect divides the regenerated clock into four phase staggered transmission subclocks $W_1$, $W_2$, $W_3$ and $W_4$, which are staggered in phase by $\pi/2$ radians and which have a frequency of ¼ the external clock. Subclocks $W_1$, $W_2$, $W_3$ and $W_4$ are applied to four parallel symbol storage registers 63, 61, 59 and 57, respectively, which together form a circular buffer 55. Under normal conditions, each symbol storage register receives a data packet from buffer staging 47 every fourth clock pulse.

The symbols or data packets stored in registers 57, 59, 61 and 63 are reserialized by multiplexor 65 which is used to read each of the registers of circular buffer 55 in sequence and to place the packets into symbol buffer 67. Symbol buffer 67 is clocked by an internal clock. Multiplexor 65 is clocked by phase staggered internal subclocks $R_1$, $R_2$, $R_3$ and $R_4$ which are generated by counter 69, which in turn is clocked by the internal clock. Counter 69 produces subclocks $R_1$, $R_2$, $R_3$ and $R_4$ which are phase staggered by $\pi/2$ radians and which have a frequency of ¼ the internal clock.

Nominally, the operations of writing to and reading from circular buffer 55 are separated by $\pi$ radians, with the internal clock "trailing" the external clock. Subclocks $W_1$, $W_2$, $W_3$ and $W_4$ should be synchronized with subclocks $R_3$, $R_4$, $R_1$ and $R_2$, respectively. That is, when symbol register 63 is being loaded ($W_4$ being asserted) then symbol register 59 is being read (responsive to subclock $R_2$ being asserted). Similarly, when symbol register 57 is being loaded then register 61 is being read. When register 59 is being loaded then register 63 is being read and when register 61 is being loaded then register 57 is being read.

Counters 53 and 69 each receive skip inputs which when asserted cause the counters to, in effect, "hang" on a current output. In other words, a particular subclock is held high for as long as the skip signal is asserted. If counter 53 holds one of subclocks $W_1$, $W_2$, $W_3$ and $W_4$ high for one cycle of the external clock, one symbol in the incoming sequence of packets is skipped. If counter 69 holds one of subclocks $R_1$, $R_2$, $R_3$ and $R_4$ high for one cycle of the internal clock, then the reading of a symbol from circular buffer 55 into symbol buffer 67 is delayed by one cycle. As long as the external clock does not overrun the relative phase of the internal clock no data is lost however. By delaying one or the other clocks the preferred phase relationship between the two sets of subclocks is restored.

Application of the input side skip signal and the output side skip signal to counters 53 and 69, respectively, is based on the phase relationship of the external clock and the internal clock. A bidirectional phase detector 71 utilizes the two sets of subclocks to provide for comparison of the phases of the external and internal clocks.

When the external clock has a higher frequency than the internal clock, the external clock gains (or increases its phase lead) on the phase of the internal clock. To detect gain in the phase of the external clock on the phase of the internal clock, one of the subclocks $W_1$ is used to clock each of three latches 73, 75 and 77. Latches 73, 75 and 77 are set by internal subclocks $R_4$, $R_3$ and $R_2$, respectively. Thus latch 73 generates an output in response to subclocks $W_1$ and $R_4$ coinciding. This occurs when the relative phase of the internal clock has gained on the phase of the external clock relative to the nominal phase relationship, as would happen if the internal clock is running faster than the external clock. Latch 73 going high results in random walk filter 79 being decremented. Latch 75 generates an output in response to subclocks $W_1$ and $R_3$ partially or fully coinciding. This occurs when the internal clock has the desired phase relationship with the external clock. Latch 73 going high results in random walk filter 79 being decremented. Latch 77 generates an output in response to subclocks $W_1$ and $R_2$ partially or fully coinciding. This occurs when the relative phase of internal clock has lost ground against the phase of the external clock, as happens if the internal clock runs slower than the external clock. Latch 77 going high results in random walk filter 79 being incremented.

Random walk filter 79 is intended to accumulate net phase gain by the external clock on the internal clock. Random walk filter 79 is essentially a two directional count register which is reset to its midrange value each time net subtractions from the count reduce the value past 0. Similarly, filter 79 is reset to its midrange value whenever the net accumulated count overflows the register. An accumulated count overflow results in generation of an input side skip signal Skip$_1$ which is latched by latch 81. No output results from the count of random walk filter 79 passing 0. The input side skip signal is applied to an input of AND gate 83. If ISIDLE is high, or as soon as ISIDLE goes high, the input side skip signal is propagated through AND gate 83 to the skip input of counter 53 and to the reset input of latch 81. As a result, the output of counter 53 is delayed by one external clock cycle and one idle symbol is overwritten in buffer stages 47 before it can be written into circular buffer 55. Because the frequencies of the internal clock and the external clock are very close (differing by at most a few hundred parts per million) such a delay inserts a phase compensation between the clocks of almost exactly $\pi/2$ radians.

When the internal clock has a higher frequency than the external clock, the internal clock gains (or decreases its phase lag) on the phase of the external clock. To detect gain in the phase of the internal clock on the phase of the external clock, one of the internal subclocks $R_1$ is used to clock each of three latches 85, 87 and 89. Latches 85, 87 and 89 are set by external subclocks $W_4$, $W_3$ and $W_2$, respectively. Thus latch 85 generates an output in response to subclocks $R_1$ and $W_4$ partially or fully coinciding. This occurs when the relative phase of the external clock has gained on the phase of the internal clock relative to the nominal phase relationship, as would happen if the external clock is running faster than the internal clock. Latch 85 going high results in random walk filter 91 being decremented. Latch 87 generates an output in response to subclocks $R_1$ and $W_3$ partially or fully coinciding. This occurs when the internal clock has the desired phase relationship with the external clock. Latch 87 going high results in random walk filter 91 being decremented. Latch 89 generates an output in response to subclocks $R_1$ and $W_2$ partially or fully coinciding. This occurs when the relative phase of internal clock has gained on the phase of the external clock, as happens if the internal clock runs faster than the external clock. Latch 89 going high results in random walk filter 91 being incremented.

Random walk filter 91 is intended to accumulate net phase gain by the internal clock on the external clock. Random walk filter 91 is essentially a two directional count register which is reset to its midrange value each time net subtractions from the count reduce the value past 0. Similarly, filter 91 is reset to its midrange value whenever the net accumulated count overflows the register. An accumulated count overflow results in generation of an output side skip signal which is latched by latch 93. No output results from the count of random walk filter 91 passing 0 in the negative direction. The output side skip signal is applied a skip input of counter 67 and through a delay element 95 to the reset input of latch 93. As a result, the output of counter 69 is delayed by one internal clock cycle in turn delaying the reading of symbols into symbol buffer 67 by one clock cycle. Because the frequencies of the internal clock and the external clock are very close (differing by at most a few hundred parts per million) such a delay inserts a phase compensation between the clocks of almost exactly $\pi/2$ radians.

Figure 4:
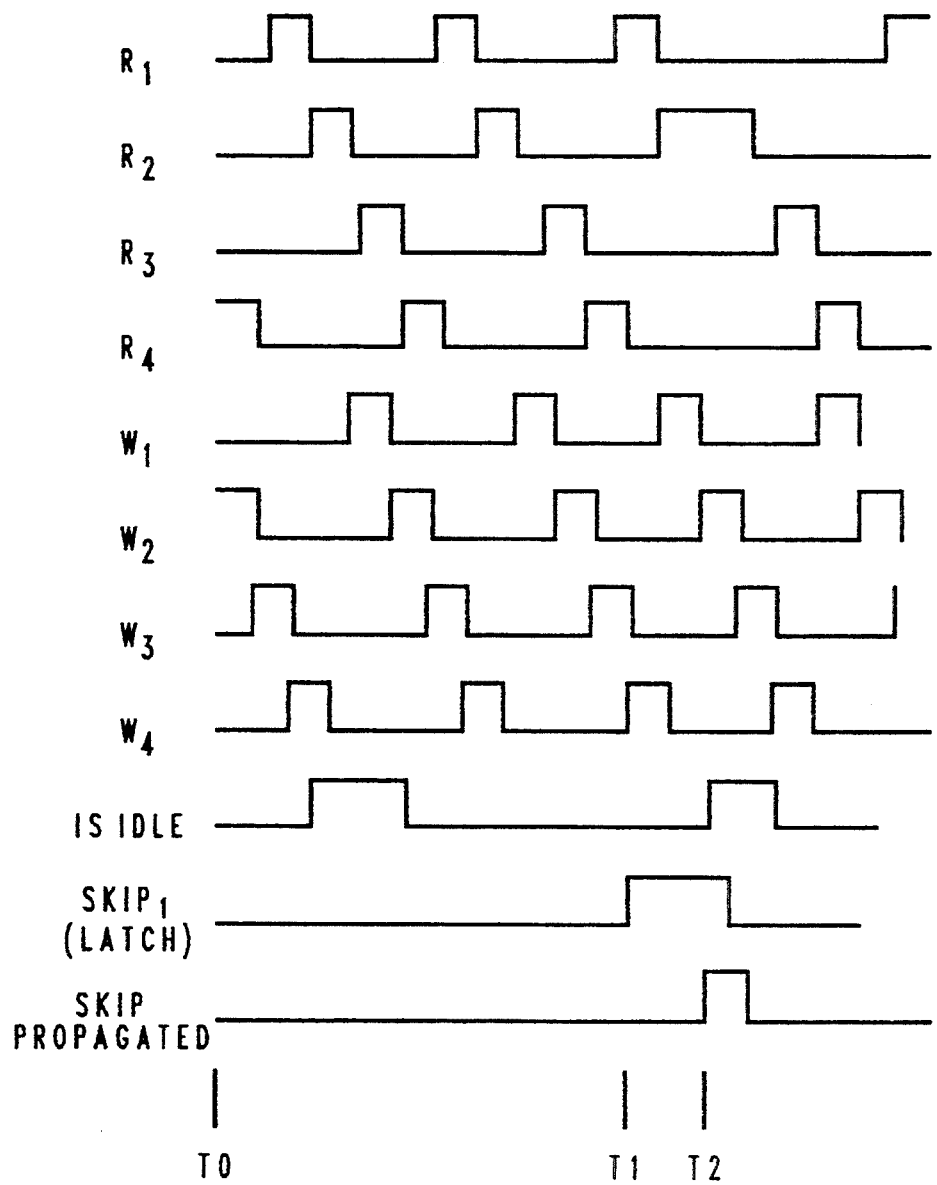
FIG. 4 is a timing diagram for the elastic buffer of FIG. 3.

FIG. 4 is a timing diagram illustrative of the circumstance where the internal clock has a higher frequency than the external clock. The differences in frequency are greatly exaggerated over what is encountered in actual practice for purposes of the illustration. The external clock is divided into four external subclocks $W_1$, $W_2$, $W_3$ and $W_4$, which are phase staggered with respect to one another and which each have a frequency equal to one fourth the external clock. The internal clock is similarly divided into four subclocks $R_1$, $R_2$, $R_3$ and $R_4$. At T0, $R_3$ is in phase with $W_1$. By T1, the subclock $W_4$ is in phase with subclock $R_1$, consistent with a faster running external clock. For purposes of illustration, Skip 1 is shown as going high as $R_1$ and $W_4$ come to coincide, which is the nominal time to introduce of phase correction of $\pi/2$ radians. The skip signal is shown as being propagated as ISIDLE goes high at T2. An earlier logic high going transition of ISIDLE had no effect.

The invention provides a phase detector which determines if the pointers for reading and writing are properly separated or whether a clock cycle has to skipped on either the input or output side of the buffer. The internal and external subclocks may be considered to be in the form of four (corresponding to the number of registers in the circular buffer) phase clocks to provide the appropriate pointers. Although not logically required, the random walk filters ensure that no action is taken as a result of short term phase jitter. Phase detection occurs on both the input side as well as the output side of the FIFO buffer. While symbols are deleted on the input side, none are on the output side. Any need to stuff symbols is avoided.

While the invention has been particularly shown and described with reference to a preferred embodiment, it will be understood by those skilled in the art that various changes in form and detail may be made therein without departing from the spirit and scope of the invention.

What is claimed is:

1. An elastic buffer comprising:
    a circular buffer;
    a connector into a transmission link, coupled to the circular buffer, over which successive symbols are received;
    a source of a first clock synchronous with the successive symbols received over the transmission link for controlling loading of the successive symbols into the circular buffer;
    a source of a second clock for controlling reading of the successive symbols from the circular buffer;
    a phase comparator taking the first and second clocks as inputs for generating an input side skip signal and an output side skip signal;
    a idle detector monitoring the successive symbols for occurrence of idle symbols and generating an idle indication when an idle symbol occurs;
    means responsive to occurrence of an input side skip signal and an idle indication for omitting loading of a symbol of the successive symbols into the circular buffer; and
    means responsive to occurrence of an output side skip signal for delaying reading of the successive symbols from the circular buffer.

2. The elastic buffer of claim 1, wherein the circular buffer includes a plurality of symbol storage registers in parallel.

3. The elastic buffer of claim 2, wherein the means responsive to occurrence of an input side skip signal and an idle indication for omitting loading of a symbol includes a read counter element taking the first clock as an input and generating a plurality of phase staggered input subclocks, each of which is used to enable a different symbol storage register, the read counter element being further responsive to occurrence of the input side skip signal for delaying the phase of the phase staggered subclocks.

4. The elastic buffer of claim 2, wherein the circular buffer further comprises a multiplexor connected to read the symbol storage registers and wherein the means responsive to occurrence of an output side skip signal for delaying reading of successive symbols from the circular buffer further includes a write counter element taking the second clock as an input and generating a plurality of phase staggered output subclocks, each of which is associated with a different symbol storage register, and applying the phase staggered output subclocks to the multiplexor to cause reading of the symbol storage registers in a successive sequence, the write counter being further responsive to the output side skip signal for delaying in phase the phase staggered output subclocks.

5. The elastic buffer of claim 3, wherein the circular buffer further comprises a multiplexor connected to read the symbol storage registers and wherein the means responsive to occurrence of an output side skip signal for delaying reading of successive symbols from the circular buffer further include a write counter element taking the second clock as an input and generating a plurality of phase staggered output subclocks, each of which is associated with a different symbol storage register, and applying the phase staggered output subclocks to the multiplexor to cause reading of the symbol storage registers in a successive sequence, the write counter being further responsive to the output side skip signal for delaying in phase the phase staggered output subclocks.

6. The elastic buffer of claim 5, wherein the phase comparator includes:
   first comparator means taking as inputs a selected phase staggered input subclock and a set of phase staggered output subclocks from the write counter element which have a nominal phase relationship with the phase staggered input subclock for generating decrement and increment signals when the phase relationship departs from the nominal phase relationship;
   second comparator means taking as inputs a selected phase staggered input subclock and a set of phase staggered output subclocks which have a nominal phase relationship for generating decrement and increment signals when the phase relationship departs from the nominal phase relationship;
   a first random walk filter taking as inputs the decrement and increment signals from the first comparator means for accumulating gains in phase by the first clock on the second clock; and
   a second random walk filter taking as inputs the decrement and increment signals from the second comparator means for accumulating gains in phase by the second clock on the first clock.

7. The elastic buffer of claim 6, wherein the first random walk filter is responsive to the accumulated gain in phase passing a first predetermined threshold for generating the input side skip signal.

8. The elastic buffer of claim 7, wherein the second random walk filter is responsive to the accumulated gain in phase passing a second predetermined threshold for generating the output side skip signal.

9. The elastic buffer of claim 1, connected as a first in, first out buffer in a scalable coherent interface node in a data processing system.

10. A method of buffering symbols in a communications interface on a node where a transmission clock for arriving data packets and an internal clock for the node are independent, the method comprising:
   detecting idle symbols in the arriving data packets;
   accumulating phase gain of the transmission clock on the internal clock and generating an input side skip signal if accumulated phase gain exceeds a first predetermined threshold;
   writing the arriving data packets into a circular buffer in synchronous with the transmission clock;
   skipping writing an arriving data packet in response to the input side skip signal and concurrent detection of an idle symbol;
   accumulating phase gain of the internal clock on the transmission clock and generating an output side skip signal if accumulated phase gain exceeds a second predetermined threshold;
   reading data packets from the circular buffer substantially in synchronous with the internal clock; and
   delaying reading the data packets from the circular buffer in response to the output side skip signal.

11. The method of claim 10, further comprising:
   dividing the transmission clock into a plurality of staggered phase transmission subclocks; and
   dividing the internal clock into a plurality of staggered phase internal subclocks.

12. The method of claim 11, wherein accumulating phase gain of the transmission clock on the internal clock and generating an input side skip signal if accumulated phase gain exceeds a predetermined threshold includes:
   detecting overlap of a staggered phase transmission subclock with selected staggered phase internal subclocks;
   incrementing an input phase gain count in response to detection of overlap of the staggered phase transmission subclock and a nominally leading staggered phase internal subclock and decrementing the input phase gain count in response to detection of overlap of the staggered phase transmission subclock and a nominally trailing staggered phase internal subclock; and
   responsive to the input phase gain count exceeding a predetermined threshold, generating the input skip signal.

13. The method of claim 12, wherein accumulating phase gain of the internal clock on the transmission clock includes:
   detecting overlap of a staggered phase internal subclock with selected staggered phase transmission subclocks;
   incrementing a output phase gain count in response to detection of overlap of the staggered phase internal subclock and a nominally leading staggered phase transmission subclock and decrementing the output phase gain count in response to detection of overlap of the staggered phase internal subclock and a nominally trailing staggered phase transmission subclock; and responsive to the output phase gain count exceeding predetermined threshold, generating the output skip signal.

14. Apparatus comprising:

means for receiving data packets and a transmission clock over a unidirectional data link;

means for detecting idle symbols among the data packets;

means for accumulating phase gain of the transmission clock on an internal clock and generating an input side skip signal if accumulated phase gain exceeds a first predetermined threshold;

a circular buffer accepting the data packets in synchronous with the transmission clock;

means for omitting application of a beat of the transmission clock to the circular buffer in response to the input side skip signal and concurrent detection of an idle symbol;

means for accumulating phase gain of the internal clock on the transmission clock and generating an output side skip signal if accumulated phase gain exceeds a second predetermined threshold;

means for reading data packets from the circular buffer substantially in synchronous with the internal clock; and means for delaying reading the data packets from the circular buffer in response to the output side skip signal.

15. The apparatus of claim 14, and further comprising:

means for dividing the transmission clock into a plurality of staggered phase transmission subclocks; and means for dividing the internal clock into a plurality of staggered phase internal subclocks.

16. The apparatus of claim 15, wherein the means for accumulating phase gain of the transmission clock on the internal clock include:

means for detecting overlap of a staggered phase transmission subclock with selected staggered phase internal subclocks;

an input side random walk filter for incrementing a phase gain count in response to detection of overlap of the staggered phase transmission subclock and a nominally leading staggered phase internal subclock and decrementing the phase gain count in response to detection of overlap of the staggered phase transmission subclock and a nominally trailing staggered phase internal subclock; and means responsive to overflow of the phase gain count for generating the input skip signal.

17. The apparatus of claim 16, wherein the means for accumulating phase gain of the internal clock on the transmission clock include:

means for detecting overlap of a staggered phase internal subclock with selected staggered phase transmission subclocks;

an output side random walk filter for incrementing a phase gain count in response to detection of overlap of the staggered phase internal subclock and a nominally leading staggered phase transmission subclock and decrementing the phase gain count in response to detection of overlap of the staggered phase internal subclock and a nominally trailing staggered phase transmission subclock; and means responsive to overflow of the phase gain count for the output side random walk filter for generating the output skip signal.

18. A distributed data processing system comprising:

a plurality of independently clocked nodes;

a plurality of unidirectional transmission links sequentially interconnecting the plurality of independently clocked nodes:

a first in, first out data buffer on each of the plurality of independently clocked nodes for receiving data packets over the unidirectional transmission links;

each first in, first out data buffer providing for skipping a received data packet corresponding to an idle symbol in response to a first clock for the received data packets overtaking a second clock of the node on which the first in, first out data buffer is disposed; and each first in, first out data buffer providing for delaying reading of a received data packet from the buffer in response to the second clock for the node overtaking the first clock of the received data packets.

19. The distributed data processing system of claim 18, wherein a first in, first out buffer includes:

a circular buffer;

a connector for connection into a unidirectional transmission link over which successive parallel data packets are received;

a phase comparator taking the first clock for the received data and the second clock for the node as inputs for generating an input side skip signal and an output side skip signal;

an idle detector monitoring the successive data packets for occurrence of idle symbols and generating an idle indication when an idle symbol occurs;

means responsive to occurrence of an input side skip signal and an idle indication for omitting loading of a symbol from successive symbols into the circular buffer; and means responsive to occurrence of an output side skip signal for delaying reading of successive symbols from the circular buffer.

* * * * *